Nov. 9, 1965  W. C. GRUBB, JR  3,217,327
RADIO DIRECTION FINDER
Filed June 5, 1963
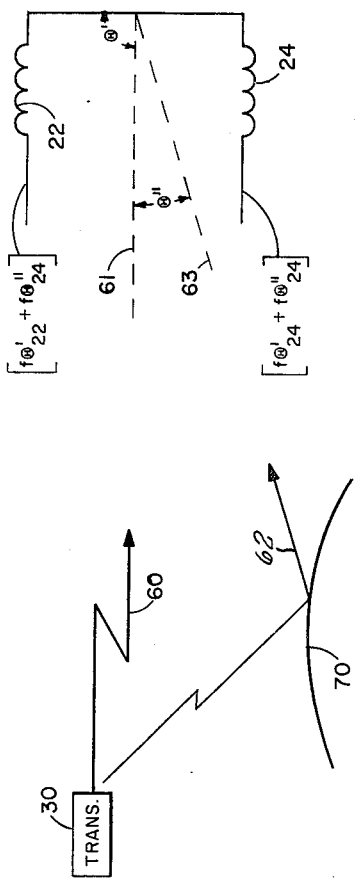
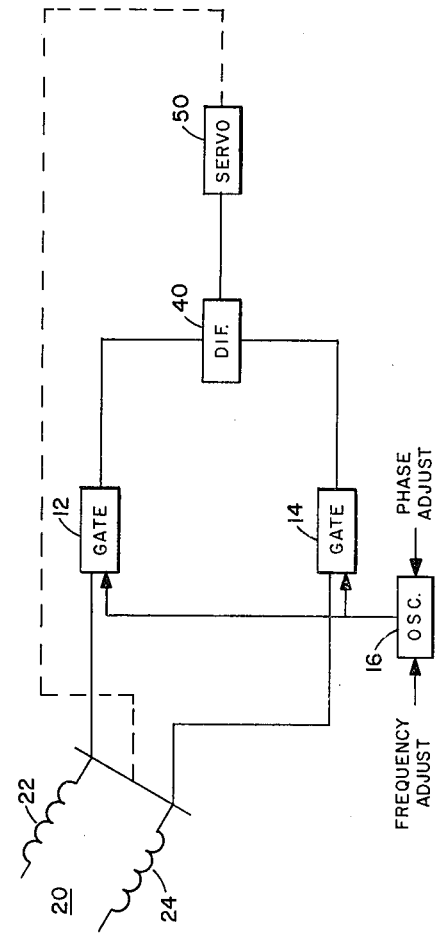
FIG. 2
FIG. 1
Walter C. Grubb Jr.
*INVENTOR.*
BY

3,217,327
RADIO DIRECTION FINDER
Walter C. Grubb, Jr., Wickatunk, N.J., assignor, by mesne assignments, to the United States of America as represented by the Secretary of the Army
Filed June 5, 1963, Ser. No. 285,844
6 Claims. (Cl. 343—113)

This invention relates generally to a radio direction finder and more particularly to direction finding equipment for tracking moving radio frequency transmitters.

In the usual direction finding equipment the phase differential between two signals is used as a means of sensing the relative off-target axial position of the receiver antenna. Owing to the difference in transit time between the wave fronts off boresight, a phase difference has been shown to exist, proportional to the fractional wavelength separation between two antenna elements.

A large physical discontinuity or reflecting surface present in the side lobes of the antenna pattern will cause a lack of symmetry in the antenna reception pattern, since reflected components traveling over a longer path arrive at the antenna at a later time than direct waves. Hence, the reflected components lag the direct wave and cause the position at which a symmetry of phase balance, or a minimum of phase difference should occur to deviate from the location it would be in without the reflecting surface being present.

It is seen that to have some means of rejecting off phase components from the antenna would serve as a means of maintaining the original position of symmetry in the presence of a reflecting object within a side lobe, since inphase components would not cause an error.

A signal from a moving transmitter is subject to the well known doppler effect as well as variations in strength of the received signal caused by multi-path reflections, some enhancing, some subtracting from the signal level induced in the receiver antenna.

It is therefore an object of this invention to eliminate the effects of phase differences between received signals in a radio direction finder.

It is a further object of this invention to provide a radio direction finder that is insensitive to reflected signals.

A still further object of this invention is to provide an improved radio direction finder capable of accurately tracking a moving radio frequency transmitter.

Other features, objects and advantages of the present invention will become more apparent upon making reference to the following detailed description taken in conjunction with the accompanying drawings, wherein:

FIGURE 1 is a block diagram of a preferred embodiment of the invention; and

FIGURE 2 is an illustration of off-boresight error caused by reflected signals.

A preferred embodiment of a radio direction finder according to the invention is shown in FIGURE 1 wherein phase controlled variable gate circuits 12 and 14 in conjunction with a variable frequency and phase oscillator 16 form a phase rejection circuit. Gates 12 and 14 are also connected to receiving antenna 20 for receiving signals from a radio transmitter 30 (shown in FIGURE 2), which may be moving. The gate circuit outputs are connected to differencing circuit 40 which is in turn connected to servo system 50.

The multi-path error caused by signal bounce from reflecting surfaces is illustrated in FIGURE 2. Transmitter 30 radiates a direct wave signal 60 toward the antenna along an axis 61. Signal 62 is reflected toward the antenna along an axis 63 by surface 70. The phase of the direct wave signal received by the antenna $f\theta'$ is defined by $[f(t) \pm f(d)]Nl_1(\phi_1)$ and the reflected wave signal $f\theta'$ is defined by $$[f(t) \pm f(d)]\frac{Nl_2}{\lambda}(\phi_2)$$

where:

$f(t)$ = the transmitted signal
$f(d)$ = signal due to Doppler shift
$N$ = any integer relating to multiples of $2\pi$ radians per wavelength of path length
$l_1, l_2$ = path length over the direct and multipath distance
$\lambda$ = wave length of transmitted signal
$\phi_1, \phi_2$ = direction of travel of direct and reflected waves with respect to plane of antenna.

Assuming now that no reflected waves are present, then the only signal received by the antenna would be related to direct wave signal 60. This signal consists of two components, that is, the signals induced in antenna elements 22 and 24 respectively, $f\theta_{22}'$ and $f\theta_{24}'$. The off-target position of the antenna is indicated by the output of differencing circuit 40 which is $f\theta_{22}' - f\theta_{24}'$. The total received signal, when reflected signals are present, is therefore seen to include components related to the direct wave and the reflected wave in element 22 and components related to the direct wave and the reflected wave in element 24.

In operation of the direction finder variable oscillator 16 is set to generate an output of the same frequency and phase as the transmitted signal. The phase and frequency of oscillator 16 may be kept in coincidence with the transmitted signal either manually or with other conventional sensing devices. By virtue of gates 12 and 14, the undesired phases are therefore eliminated from the input to the differencing circuit which provides an output signal related to the off-target axial position of the receiver antenna. This signal is fed to servo 50 which provides positional correction signals to align the antenna with the transmitter.

While the invention has been described with reference to a preferred embodiment thereof, it will be apparent that various modifications and other embodiments thereof, will be apparent that various modifications and other embodiments thereof will occur to those skilled in the art within the scope of the invention. Accordingly, I desire the scope of my invention to be limited only by the appended claims.

I claim:
1. A radio direction finder tracking system comprising:
    (a) a receiver antenna including a plurality of antenna elements for receiving signals from a radio frequency transmitter;
    (b) a plurality of phase controlled variable gate means connected to said antenna elements;
    (c) a variable phase and frequency oscillator connected to said gate means for permitting the passage therethrough of signals having only a desired phase and frequency;
    (d) a differencing circuit connected to said gate means for providing a signal related to the difference between the output signals of said gate means; and
    (e) a servo system connected to said differencing circuit for controlling the position of said antenna.
2. A radio direction finder tracking system comprising:
    (a) a receiver antenna having first and second antenna elements for receiving signals from a radio frequency transmitter;
    (b) first and second phase controlled variable gate means connected to said first and second antenna elements;

(c) means for controlling said gate means whereby only signals received by said antenna having a desired phase are passed through said gate; and (d) a differencing circuit connected to said gate means for providing a signal equal to the difference of the output signals of said gate means.

3. A tracking system as set forth in claim 2 wherein said controlling means comprises a variable phase and frequency oscillator.

4. A radio direction finder tracking system for locating a radio frequency transmitter comprising in combination:

(a) a receiver antenna having a plurality of antenna elements for receiving signals from said transmitter;

(b) means connected to said antenna elements for eliminating unwanted signals; and (c) a differencing circuit connected to said signal eliminating means for providing a signal proportional to the difference between signals received by said antenna elements having a desired phase relationship to the transmitted wave.

5. A radio direction finder tracking system as set forth in claim 4 wherein said means for eliminating unwanted signals comprises a phase rejection circuit.

6. A tracking system as set forth in claim 5 wherein said phase rejection circuit comprises a plurality of phase controlled variable gate means connected to said antenna elements and further connected to and controlled by a variable phase and frequency oscillator.

References Cited by the Examiner

UNITED STATES PATENTS 2,736,019    2/56    Vogely.

CHESTER L. JUSTUS, *Primary Examiner.*